T. P. AUSTIN.
Street Lamp.
No. 106,764. Patented Aug. 30, 1870.
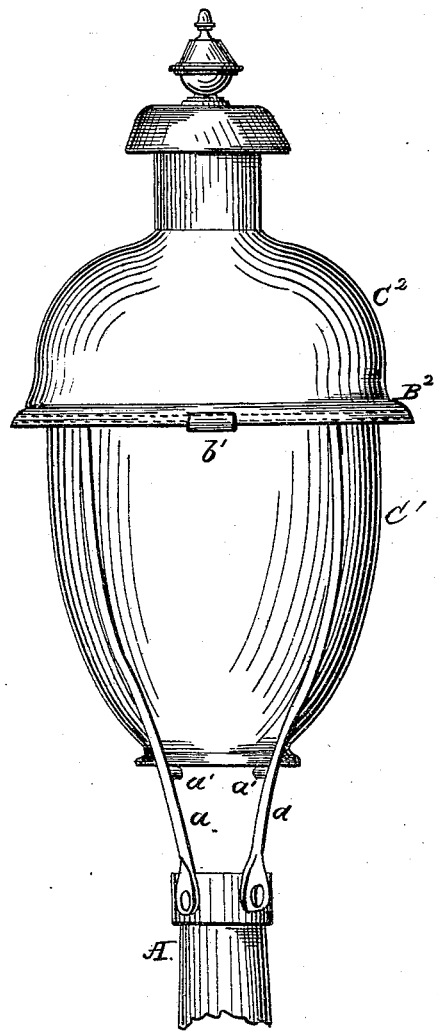
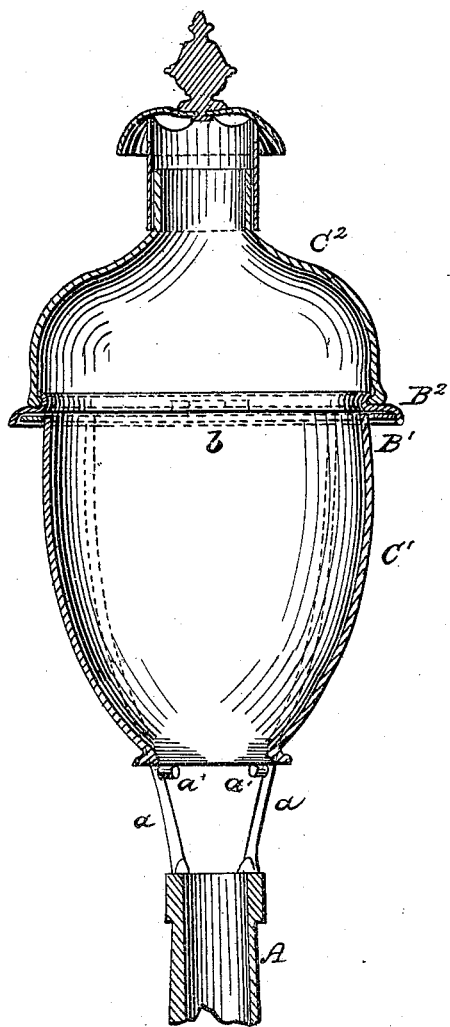
Witnesses
J. T. Hedrick
B. S. Hedrick
Inventor:
Theodore P. Austin
by his attorney
J. D. Stetson

UNITED STATES PATENT OFFICE.

THEODORE P. AUSTIN, OF NEW YORK, N. Y.

IMPROVEMENT IN STREET-LAMPS.

Specification forming part of Letters Patent No. 106,764, dated August 30, 1870.

*To all whom it may concern:*

Be it known that I, THEODORE P. AUSTIN, of New York city, in the State of New York, have invented certain new and useful Improvements in Street-Lamps and lamps generally for outdoor use, of which the following is a description:

The accompanying drawing forms a part of this specification and shows the best form for carrying out the invention known to me.

Figure 1 is a side elevation, and Fig. 2 is a vertical section.

The drawing shows the lamp with its connection to the top of the lamp-post, but does not show the gas-burner, which, it will be understood, is of the ordinary or any suitable character, and extends up into the lamp, so as to protect the flame from wind by holding it at a proper elevation within the shielding glass.

Similar letters of reference indicate like parts in all the figures.

A is the head of the lamp-post, and $a\ a\ a\ a$ are four slender rods, which extend up around the lamp and firmly support a metal ring, $B^1$, of the form shown.

There are arms $e'\ e'$, &c., which extend inward from the rods $a$ and support the lower glass, $C^1$, while the upper glass, $C^2$, formed entirely distinct therefrom, is fixed firmly to the ring $B^2$.

The lower glass, $C^1$, is high enough to reach up and be embraced loosely within the ring $B^1$. It may also extend up a little farther, standing loosely also within the ring $B^2$, if desired.

The upper glass, $C^2$, may be joined to the upper ring, $B^2$, by cement or by joining the metal tightly upon a flange on the glass, or by both these means.

The upper ring, $B^2$, is turned up on the inner edge and down on the outer edge for the purpose, in part, of shedding off water in stormy weather. Another purpose is to securely hold the upper ring, $B^2$, and its attachments against lateral displacement.

The ring $B^2$ is hinged to the ring $B^1$ by a hinge, $b$, (shown in dotted lines in Fig. 2,) and, when desired, the entire top can be turned up to allow access to the interior of the lamp and to allow the lower glass, $C^1$, to be lifted out and exchanged when necessary. The top of the part $C^2$ is surmounted with a suitable ventilator, as shown.

The bottom of the lower glass, $C^1$, is flanged, as shown, and the opening is large enough to allow the lamp to be lighted from below. The lower part, $C^1$, can be turned around freely in cleaning. The upper part, $C^2$, may be made a mirror, if preferred, in any case, to throw the light down upon the street or other place below.

I propose, in some instances, to make the upper part, $C^2$, of a kind of glass lately made public, which transmits a fraction of its light and reflects the greater part. I can, if desired, make the upper part carry the name of the street or hotel which it is used with.

The upper ring, $B^2$, and its connections may be locked down firmly to the ring $B^1$ and its connections by the spring-snap $b'$.

For some situations the whole or a portion of either glass $C^1$ or $C^2$ may be ground or variously engraved or cut, stained, or otherwise ornamented.

To endure the most violent conditions in regard to heat, cold, and wet, the glass of the upper part, $C^2$, should be shaped about as represented to allow amply for irregular contraction and expansion, and should be tough glass, well annealed.

Although I have termed the material "glass," it may be the translucent material known as "china," if preferred.

The advantage of supporting the lower part of the base, where it is always cold and still, without obstructing the light there, will be realized by that part of my invention, even if the upper part, $C^2$, is made of metal struck up or spun into shape.

I claim—

1. The ring $B^2$, fixed to the upper glass, $C^2$, and turned down at its upper edges to fit around the lower ring, $B^1$, when the latter merely supports the lower glass laterally, leaving it free in the vertical direction, as specified.

2. Also, the pins $a^1$, or their equivalents, on the rods $a$, for supporting the lower glass, $C^1$, by its lower edge, and allowing it to expand and contract freely in all directions, as specified.

3. Also, the entire combination of parts composing the improved lamp shown, the same being composed of a lower or principal glass, $C^1$, supported by its lower edge, and steadied laterally only at the top, an upper or auxiliary part, $C^2$, of glass, or analogous cheaply-molded and easily-repaired material, with the rings $B^1$ $B^2$ notching together, as shown, and the top ventilator, supporting-rods, and pins, and hinged connection, all as and for the purpose set forth.

In testimony whereof I have hereunto set my name in presence of two subscribing witnesses.

THEO. P. AUSTIN.

Witnesses:
   E. A. HEATH,
   C. C. LIVINGS.